US012571429B2

(12) United States Patent
Cao et al.

(10) Patent No.: US 12,571,429 B2
(45) Date of Patent: Mar. 10, 2026

(54) CAGE AND BALL BEARING COMPRISING THE CAGE

(71) Applicant: Aktiebolaget SKF, Gothenburg (SE)

(72) Inventors: Keqiang Cao, Shanghai (CN); Gaojie Jiang, Shanghai (CN); Meng Zhang, Shanghai (CN); He Zhu, Shanghai (CN)

(73) Assignee: Aktibolaget SKF, Gothenburg (SE)

( * ) Notice: Subject to any disclaimer, the term of this patent is extended or adjusted under 35 U.S.C. 154(b) by 116 days.

(21) Appl. No.: 18/458,251

(22) Filed: Aug. 30, 2023

(65) Prior Publication Data

US 2024/0077108 A1 Mar. 7, 2024

(30) Foreign Application Priority Data

Sep. 7, 2022 (CN) .......................... 202211088231.3

(51) Int. Cl.
*F16C 33/38* (2006.01)

(52) U.S. Cl.
CPC ................................ *F16C 33/3875* (2013.01)

(58) Field of Classification Search
CPC ......................... F16C 33/3862; F16C 33/3875
See application file for complete search history.

(56) References Cited

U.S. PATENT DOCUMENTS

| | | | | |
|---|---|---|---|---|
| 1,045,193 | A | | 11/1912 | Sachs |
| 2,861,849 | A | * | 11/1958 | Case ................... F16C 33/3887 |
| | | | | 29/898.067 |

| | | | | |
|---|---|---|---|---|
| 4,568,206 | A | * | 2/1986 | Imazaike ............ F16C 33/3875 |
| | | | | 384/530 |
| 4,902,145 | A | * | 2/1990 | Johnson .............. F16C 33/3875 |
| | | | | 384/527 |
| 7,703,986 | B2 | * | 4/2010 | Naito ................... F16C 33/3875 |
| | | | | 384/526 |
| 9,022,662 | B2 | * | 5/2015 | Ito ....................... F16C 33/6614 |
| | | | | 384/470 |
| 2013/0156360 | A1 | | 6/2013 | Uozumi |
| 2017/0292567 | A1 | | 10/2017 | Taniguchi |
| 2023/0193954 | A1 | | 6/2023 | Bai |

FOREIGN PATENT DOCUMENTS

| | | | | | |
|---|---|---|---|---|---|
| AT | | 226018 B | * | 2/2025 | |
| JP | | 2004360823 A | * | 12/2004 | ......... F16C 33/3862 |
| JP | | 2013092242 A | | 5/2013 | |
| JP | | 2014020468 A | | 2/2014 | |
| WO | | 2011098357 A1 | | 8/2011 | |
| WO | WO-2013099586 A1 | | * | 7/2013 | ............ F16C 33/303 |

* cited by examiner

*Primary Examiner* — James Pilkington
(74) *Attorney, Agent, or Firm* — Stinson LLP

(57) ABSTRACT

A cage includes a first sub-part having a plurality of first partitions integrated as a whole and a plurality of first pocket portions formed by adjacent first partitions. A second sub-part has a plurality of second partitions integrated as a whole and a plurality of second pocket portions formed by adjacent second partitions. A first recess is provided on the first partition belonging to a first set of the plurality of first partitions. A second pin extends along an axial direction from the second partition belonging to a second set of the plurality of second partitions. The second pin is fixed in its corresponding first recess. The first set of first partitions includes any one or more of the plurality of first partitions. The second set of second partitions includes any one or more of the plurality of second partitions and correspond to the first set of first partitions respectively.

14 Claims, 10 Drawing Sheets

CAGE AND BALL BEARING COMPRISING THE CAGE

CROSS-REFERENCE TO RELATED APPLICATIONS

This application claims priority to Chinese Application No. 202211088231.3, filed Sep. 7, 2022, the entirety of which is hereby incorporated by reference.

FIELD

The present disclosure relates to a cage and a ball bearing comprising the cage.

BACKGROUND

Ball bearings, especially deep groove ball bearings, are widely used in various fields. A traditional cage for a deep groove ball bearing includes, for example, a steel cage with a wave profile requiring riveting connection, a one-piece polymer prong-type cage, and so on. A window type cage is difficult to be applied to a deep groove ball bearing due to the assembling process of such cage. However, the steel cage is heavy, requires a complicated assembling process (involving riveting connection) and not suitable for high-speed applications. While the one-piece polymer prong-type cage has a semi-enclosed structure, which is lighter in weight and simple in assembling, but it is not suitable for high-speed applications either. For example, in some bearing applications that require high operation speeds, the cages will suffer from an umbrella effect.

Taking the deep groove ball bearing as an example, please refer to FIGS. 1 and 10A. As the speed is increasing, prongs of the one-piece polymer prong-type cage (also known as one-way insert cage) tend to expand and deform outward under centrifugal force, causing the so-called "umbrella effect". The umbrella effect will destroy the matching relationship between the pockets and the balls, causing interference between the pockets and the balls, thus leading to local overheating of the cage. What's more, severe umbrella effect under high speeds will cause the balls dropping-off from the cage, and the bearing will be stuck, which will lead to failure of related systems.

In addition, the prongs of the one-piece polymer prong-type cage allow large deformation so as to meet the needs of assembling process. However, such deformation operation on the cage is usually considered as risky, since it may cause the prongs of the cage to break.

SUMMARY

In view of this, the present disclosure provides a cage, comprising: a first sub-part, comprising a plurality of first partitions integrated as a whole and a plurality of first pocket portions formed by adjacent first partitions; a second sub-part, comprising a plurality of second partitions integrated as a whole and a plurality of second pocket portions formed by adjacent second partitions, wherein a pocket is formed by the first pocket portion and the corresponding second pocket portion; wherein, a first recess is provided on the first partition belonging to a first set of the plurality of first partitions, and a second pin extend along an axial direction from the second partition belonging to a second set of the plurality of second partitions, and the second pin is fixed in its corresponding first recess; wherein, the first set of first partitions comprises any one or more of the plurality of first partitions, and the second set of second partitions comprises any one or more of the plurality of second partitions and correspond to the first set of first partitions respectively.

The cage of the present disclosure overcomes the harmful umbrella effect found in the one-piece polymer prong-type cage, so that the bearing equipped with the cage of the present disclosure can operate under very high speeds. Moreover, since the structural stiffness of the cage of the present disclosure is higher, the stress at critical locations is lower, and due to its fully enclosed pocket design, it can deal with very harsh bearing working environment and bearing working requirements in comparison with the prong-type cage.

DETAILED DESCRIPTION

Figure 1:
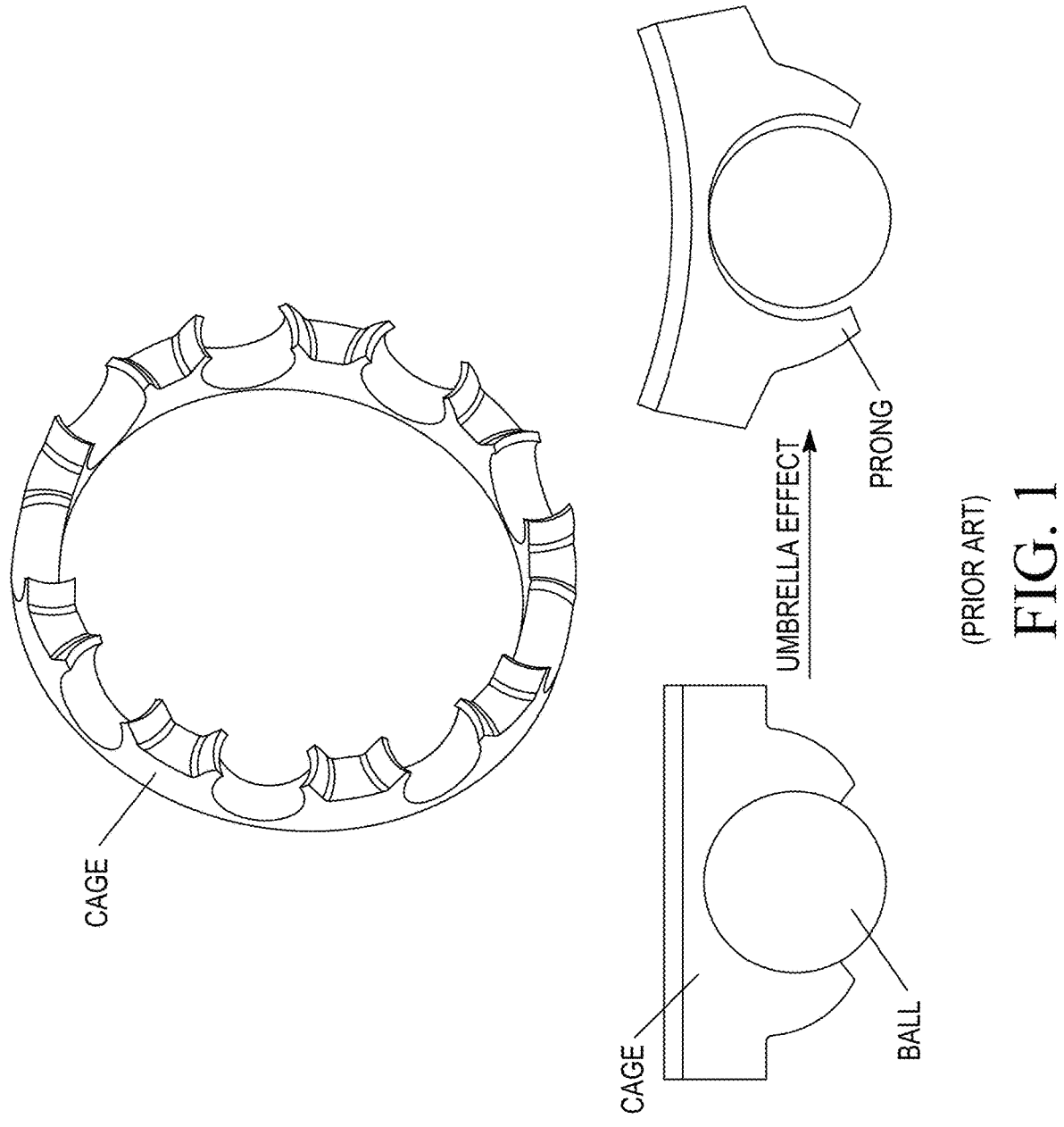
FIG. 1 is a schematic view of a prior art cage and its umbrella effect.

In order to make the purpose, technical solution and advantages of the technical solution of the present disclosure clearer, the technical solution of the embodiment of the present disclosure will be described clearly and completely in the following with the attached drawings of specific embodiments of the present disclosure. Like reference numerals in the drawings represent like components. It should be noted that a described embodiment is a part of the embodiments of the present disclosure, not the whole embodiments. Based on the described embodiments of the present disclosure, all other embodiments obtained by those skilled in the field without creative labor fall into the scope of protection of the present disclosure.

In comparison with the embodiments shown in the attached drawings, feasible embodiments within the protection scope of the present disclosure may have fewer components, other components not shown in the attached drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by those skilled in the field to which this disclosure belongs. For example, similar words such as "including" or "comprising" mean that the elements or objects appearing before the word cover the elements or objects listed after the word and their equivalents, without excluding other elements or objects. "Up", "down", "left"

and "right" are only used to indicate the relative orientation relationship when the equipment is used or the orientation relationship shown in the attached drawings. When the absolute position of the described object changes, the relative orientation relationship may also change accordingly.

For the convenience of explanation, the direction of the rotation axis of the bearing to which the cage is applied is called an axial direction, the direction perpendicular to the axial direction is called a radial direction, and the direction along the rotation direction of the bearing is called the circumferential direction. The term "inner/inward" refers to the direction toward the inside of the relevant component, whereas the term "outer/outward" refers to the direction toward the outside of the relevant component.

Figure 2:
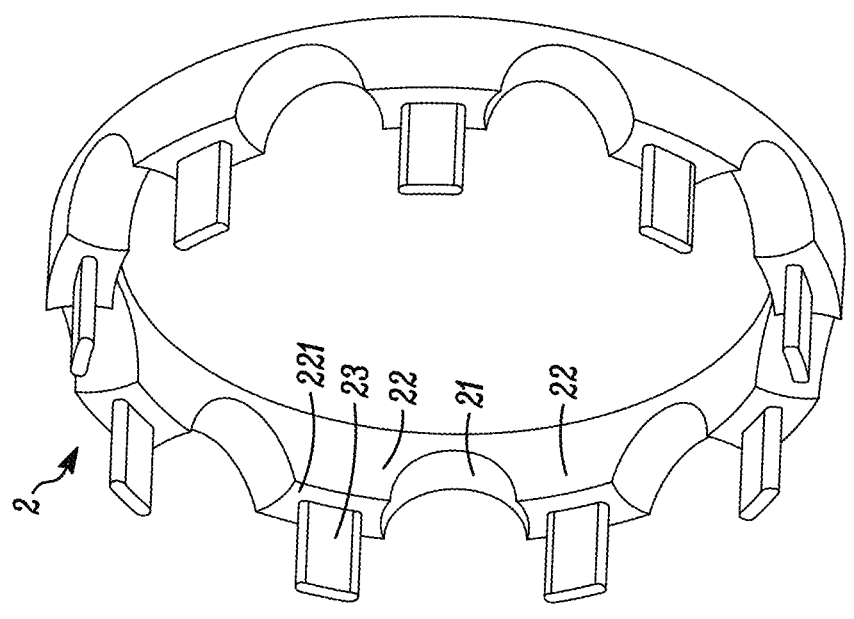
FIGS. 2-3 are schematic views of a cage according to a preferred embodiment of the present disclosure.
Figure 2:
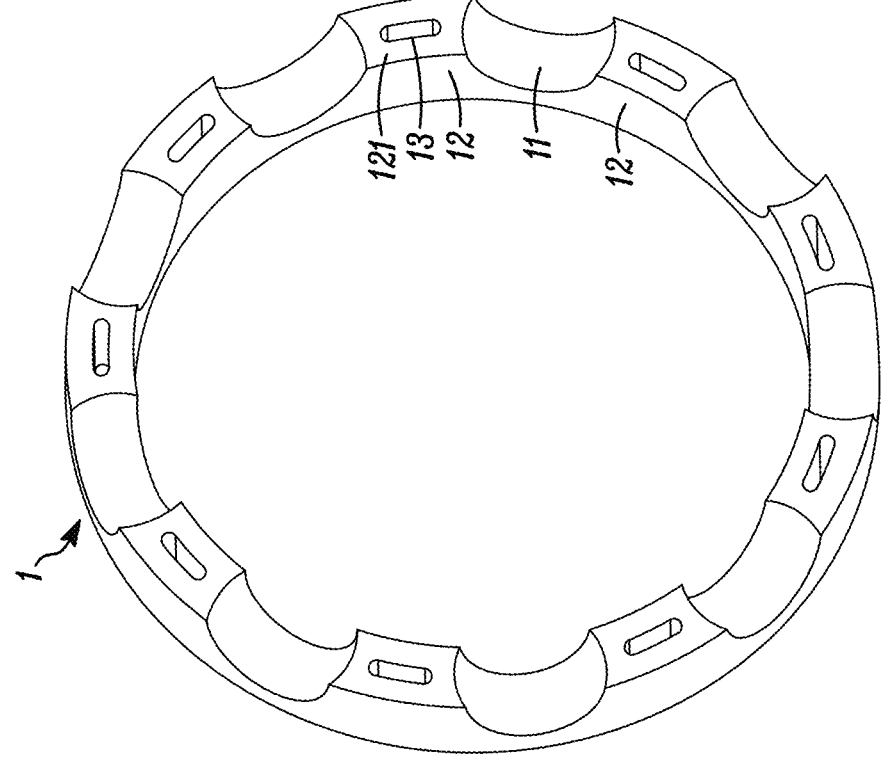
Figure 3:
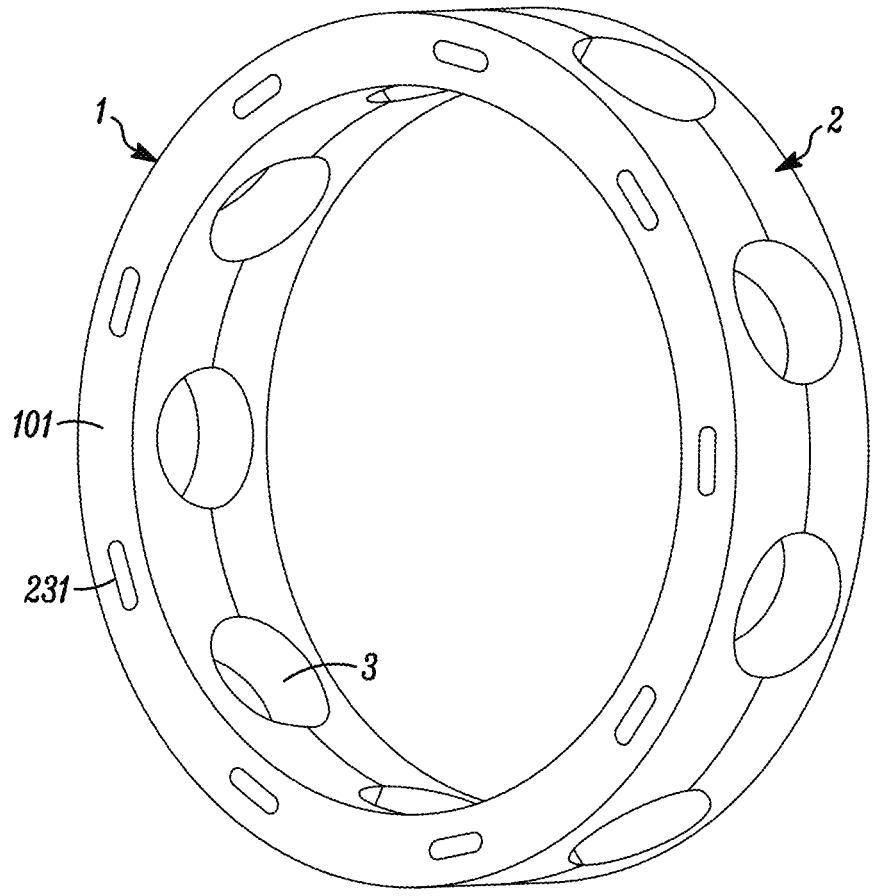

Referring to the preferred embodiment of FIGS. 2-3, the present disclosure provides a cage comprising a first sub-part 1 and a second sub-part 2 which are assembled oppositely along an axial direction and fixed together. In this embodiment, the cage is suitable for ball bearings, especially for deep groove ball bearings.

The first sub-part 1 comprises a plurality of first partitions 12 integrated as a whole and a plurality of first pocket portions 11 formed by the adjacent first partitions 12. Accordingly, the second sub-part 2 comprises a plurality of second partitions 22 integrated as a whole and a plurality of second pocket portions 21 formed by adjacent second partitions 22. A pocket 3 is formed by the first pocket portion 11 and its corresponding second pocket portion 21, as shown in FIG. 3, and the pocket is used for holding a ball.

Furthermore, a first recess 13 is provided on the first partition 12 belonging to a first set of the plurality of first partitions 12, and a second pin 23 extends along the axial direction from the second partition 22 belonging to a second set of the plurality of second partitions 22, and the second pin 23 is fixed in its corresponding first recess 13. It should be understood that the "fixation" can be achieved by any suitable fixation method, such as welding, adhesion bonding, snap fit, etc.

The term "set" used here and after indicates some or all items selected from a plurality of related items, so it can also be understood as the meaning of "group". Therefore, the first set of first partitions 12 comprises any one or more of the plurality of first partitions 12, and the second set of second partitions 22 comprises any one or more combination of the plurality of second partitions 22 and should correspond to the first set of first partitions 12 respectively, thus ensuring that the first recess 13 and the second pin 23 can be fixed together accurately. In the preferred embodiment shown in FIGS. 2-3, the first set includes all the first partitions 12 and the second set includes all the second partitions 22. However, in an embodiment not shown, according to the number of the first partitions and second partitions and the assembly requirements of the cage, the first set may comprise at least two first partitions 12 evenly spaced, and correspondingly, the second set may comprise at least two second partitions 22 evenly spaced, for example.

When the cage is used for assembling a bearing, one can firstly put the balls into the pockets of one of the sub-parts, and then assemble the other sub-part to the sub-part containing the balls. The assembling process involves aligning the first recesses with the second pins, inserting the second pins into the first recesses, and then fixing the two sub-parts together, to form a cage fully enclosing the balls.

In comparison with the one-piece polymer prong-type cage of the prior art, the cage of the present disclosure eliminates the pocket openings and prongs, and realizes a full enclosure of the balls. Especially during the operation of the deep groove ball bearing, the deformation of the cage of the present disclosure is smaller, the umbrella effect can be effectively avoided, and the cage can be prevented from popping out when the bearing rotates at high speeds. Therefore, extremely high rotary speeds of the deep groove ball bearing can be realized. Moreover, this cage can also reduce stress and strain on edges, thus reducing fracture of the edges. In addition, when the bearing is in operation, the cage can guide the balls better and absorb more vibration.

On the other hand, although the material selection for the first and second sub-parts is not particularly limited, it is preferable that, in this embodiment and other preferred embodiments described later, the first sub-part 1 and second sub-part 2 are made of polymer materials, such as nylon, PA66, PA6, PEEK, etc. In comparison with the steel cage of the prior art which needs to be fixed by riveting, the cage made of polymer is lighter in weight and has better shock-absorption effect, so it is also beneficial to the application with higher rotary speeds.

It should also be understood that shape of the recess and shape of the pin are not particularly limited (some specific shapes are given in the preferred embodiment hereinafter), and the purpose is to align the first sub-part 1 with the second sub-part 2 and temporarily assemble them together, to facilitate the subsequent fixing operation.

In the preferred embodiment shown in FIGS. 2-3, the first recess 13 may be provided as a through hole penetrating through two axial sides (i.e., the axial inner side 121 and the opposite axial outer side not shown) of the corresponding first partition 12, so that an end of the corresponding second pin 23 may be exposed from the through hole. Accordingly, the fixation between the pin and the through hole can be realized by welding, that is, welding the end of the corresponding second pins 23 to the surrounding portions thereof (this includes welding the end and the surrounding portions of the through hole).

It should be understood that the term "exposed" used above means that the end 231 of the second pin 23 is slightly retracted, flushed or slightly protruded (as shown in FIG. 3) with respect to an axial outer side 101 of the first sub-part 1, as long as the "exposed" portion is suitable for welding. In addition, the specific shape of the recess and the pin can be flexibly selected, such as a roughly rounded rectangle shape as shown in FIG. 2, a prism shape, a cylinder shape or the like.

Furthermore, in the case of fixation without welding, for example, the pin and the recess can be adhesively bonded, or the size of the pin and the recess can be set to achieve an interference fit, or a snap-fit structure can be provided at the end of the pin to snap with the end of the recess (or the through hole).

Figure 4:
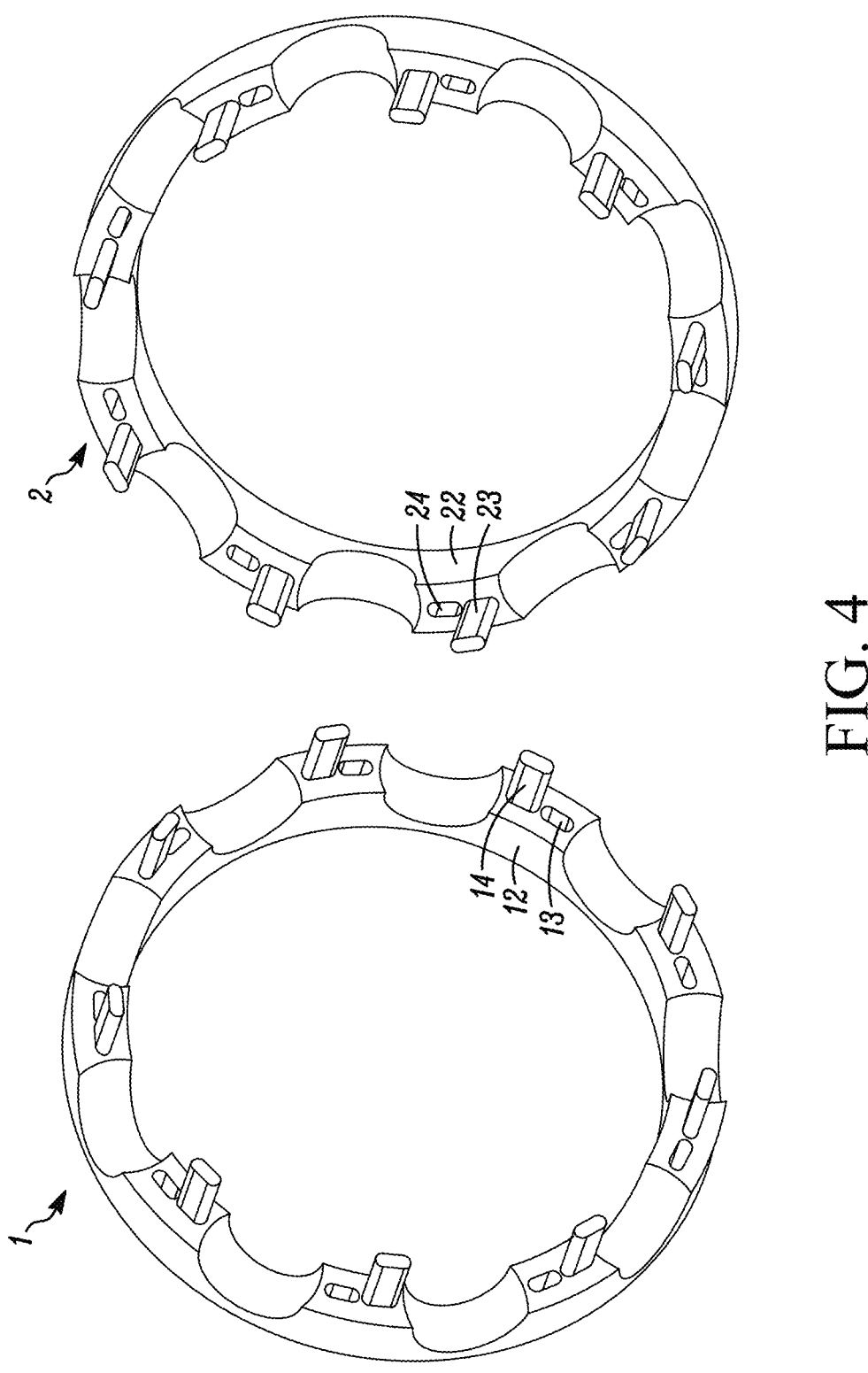
FIGS. 4-5 are schematic views of improvements of the preferred embodiments of FIGS. 2-3.
Figure 5:
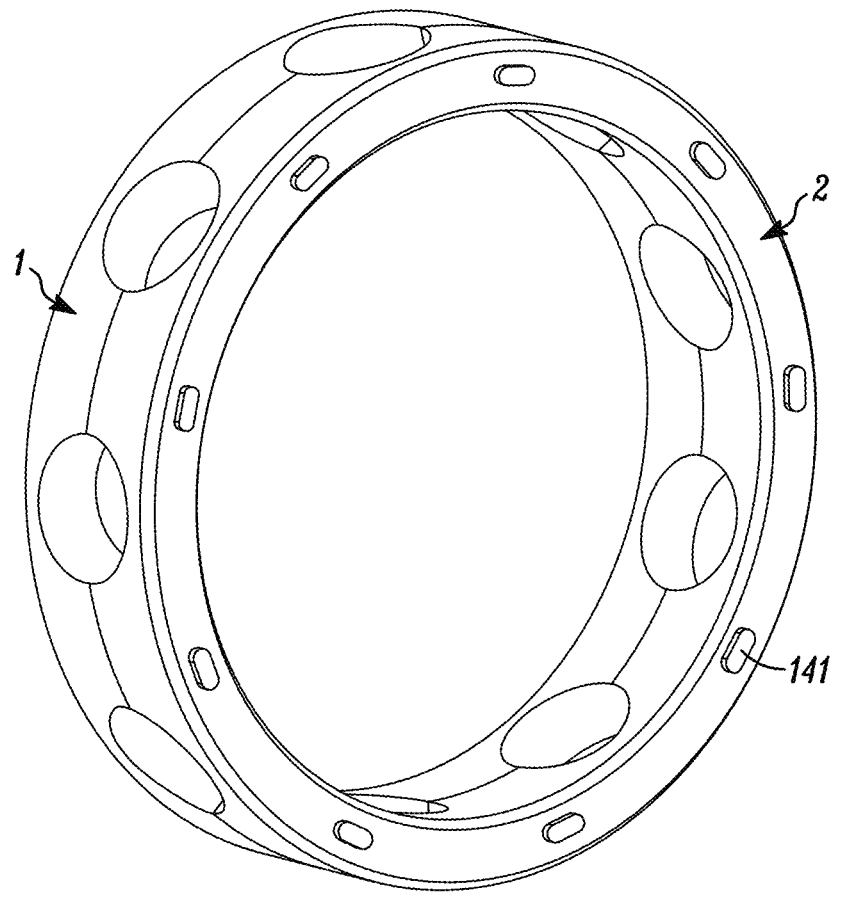

FIGS. 4 and 5 show a further improvement of the preferred embodiment according to the above. In this modified example, in addition to the first recess 13 and the second pin 23, a first pin 14 extend along the axial direction from the first partition 12 belonging to a third set of the plurality of first partitions 12, and a second recess 24 is provided on the second partition belonging to a fourth set of the plurality of second partitions 22, and the first pin 14 is fixed in its corresponding second recess 24. The third set of first partitions 12 comprises any one or more of the plurality of first partitions 12, and the fourth set of second partitions 22 comprises any one or more of the plurality of second partitions 22 and correspond to the third set of first partitions 12 respectively. According to this preferred embodiment, each partition 12, 22 of the two sub-parts 1, 2 includes a pin and a recess, and the pin and the corresponding recess can be accurately fixed together. This preferred embodiment can achieve fixation on both sides of the whole cage along the axial direction, so that the cage is more balanced and firmer.

In the preferred embodiment shown in FIG. 4, the first set and the third set contain each other (or are the same), i.e., each of the first and third sets contain all the first partitions 12; the second set and the fourth set contain each other (or are the same), i.e., each of the second and fourth sets contain all the second partitions 22. However, it should be understood that the first set and the third set may also have no intersection or have partial intersection, and the second set and the fourth set may have no intersection or have partial intersection, that is, various sets of partitions containing recess(es) and/or pin(s) can be arbitrarily chosen from the first partitions 12 and the second partitions 22, for example, according to structural needs, assembling positions, stress requirements, etc., to realize various fixation structures.

Preferably, the second recess 24 can also be provided as a through hole penetrating two axial sides (i.e., the axial inner side 221 and the opposite axial outer side not shown) of the second partitions 22, and an end of the first pins 14 may be exposed from the through hole. Accordingly, the fixation between the pin and the through hole can be realized by welding, that is, welding the end of the first pin 14 to the surrounding portions thereof.

It should be understood that, as mentioned above, in the case of fixation without welding, the fixation can also be achieved by adhesive bonding, interference fit or snap-fit.

Preferably, as shown in FIG. 4, the first recess 13 and the first pin 14 on the first sub-part 1 can be arranged side-by-side along the circumferential direction, and correspondingly, the second pin 23 and the second recess 24 on the second sub-part 2 can also be arranged side-by-side along the circumferential direction. However, it should be understood that the pins and through holes on each sub-part may have different arrangements, for example, arranged along the radial direction, or arranged along an approximately diagonal direction of the axial sides where they are located.

Further preferably, the first recess 13 and the second recess 24 may be identical, and the second pin 23 and the first pin 14 may also be identical. Furthermore, the first sub-part 1 and the second sub-part 2 may be completely identical. With this structure, the two sub-parts of the cage can be produced by only one mold, which further saves manufacturing cost and assembling cost.

Figure 6A:
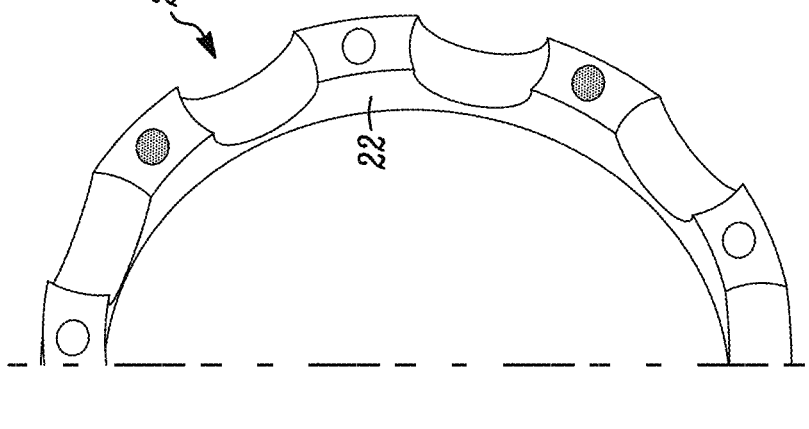
FIG. 6A is a schematic view of a cage according to another preferred embodiment of the present disclosure.
Figure 6A:
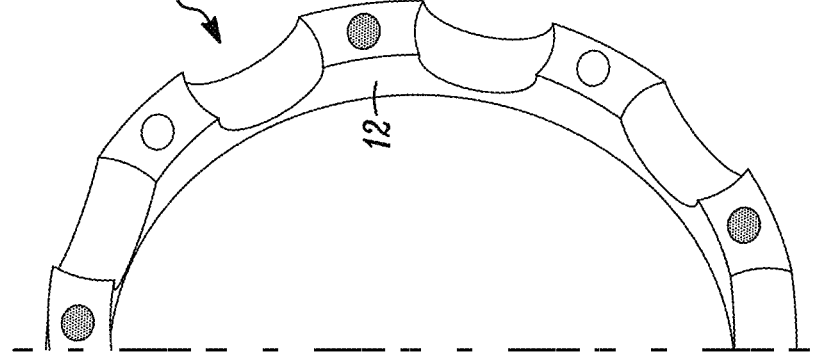

As mentioned above, the first set and the third set may have no intersection, and the second set and the fourth set may have no intersection. For example, in another preferred embodiment of the present disclosure shown in FIG. 6A, first recesses (shown schematically by hollow circles) are formed on the first set of partitions 12, and first pins (shown schematically by solid circles) extend from the third set of first partitions 12 along the axial direction.

Accordingly, second pins (shown schematically by hollow circles) extend from the second set of second partitions 22 along the axial direction, and second recesses (shown schematically by solid circles) are formed on the fourth set of second partitions 22. The first recesses and the second recesses may be formed as through holes.

Furthermore, the first recesses of the first set of and first pins of the third set are alternately arranged on the first sub-part 1, and similarly, the second pins of the second set and the second recesses of the fourth set are alternately arranged on the second sub-part 2.

During assembly, the second pins of the second set are inserted into the corresponding first recesses of the first set and the end of each second pin is exposed from the corresponding first recess; the first pins of the third set are inserted into the corresponding second recesses of the fourth set and the end of each first pin is exposed from the corresponding second recess. Subsequently, the first sub-part 1 and the second sub-part 2 are fixed together, for example, by welding the end of each first pin and the end of each second pin with their surrounding portions, or by other fixation means.

With this configuration, the first sub-part 1 and the second sub-part 2 may also be completely identical, that is, the two sub-parts of the cage can be produced by only one mold, which further saves the manufacturing cost and the assembling cost.

Figure 6B:
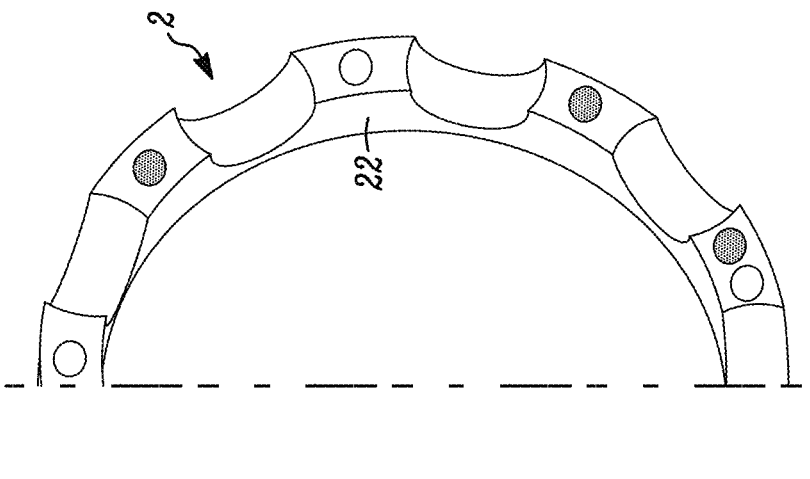
FIG. 6B is a schematic view of a cage according to another preferred embodiment of the present disclosure.
Figure 6B:
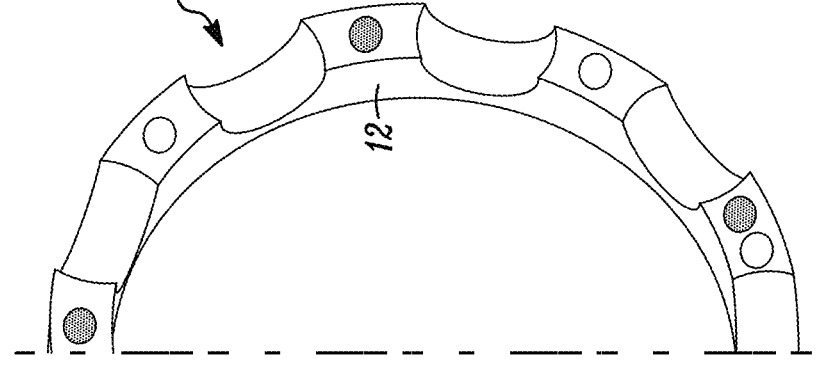

The embodiment (in which the first set and the third set are the same or have no intersection, and the second set and the fourth set are the same or have no intersection) has been shown above by the drawings. In other embodiments, as shown in FIG. 6B, the first set and the third set may partially intersect, that is, there may be three types of first partitions on the first sub-part, which are:

1) first partition(s) (part of a first set) including only first recess(es) (shown schematically by hollow circle(s));

2) first partition(s) (part of the third set) including only first pin(s) (shown schematically by solid circle(s)); and 3) first partition(s) (belonging to the intersection between the first set and the third set) including both first recess(es) (shown schematically by hollow circle(s)) and first pin(s) (shown schematically by solid circle(s));

And these three types of first partitions may be arbitrarily arranged as needed, for example, any type of first partitions may be adjacent to the same or other types of first partitions; in some embodiments, some first partitions may not be provided with any recess or pin.

Accordingly, the second set and the fourth set may also be similarly configured and arranged to partially intersect, so as to correspond to the first set and the third set respectively, which will not be repeatedly described here.

In the embodiments described in FIGS. 2-5, both the recess and the pin are formed in the middle of the corresponding partition, i.e., associated with the axial sides of the partition. In another preferred embodiment according to the present disclosure, the present disclosure provides a fixation structure formed on the radial sides of the partition.

Figure 7:
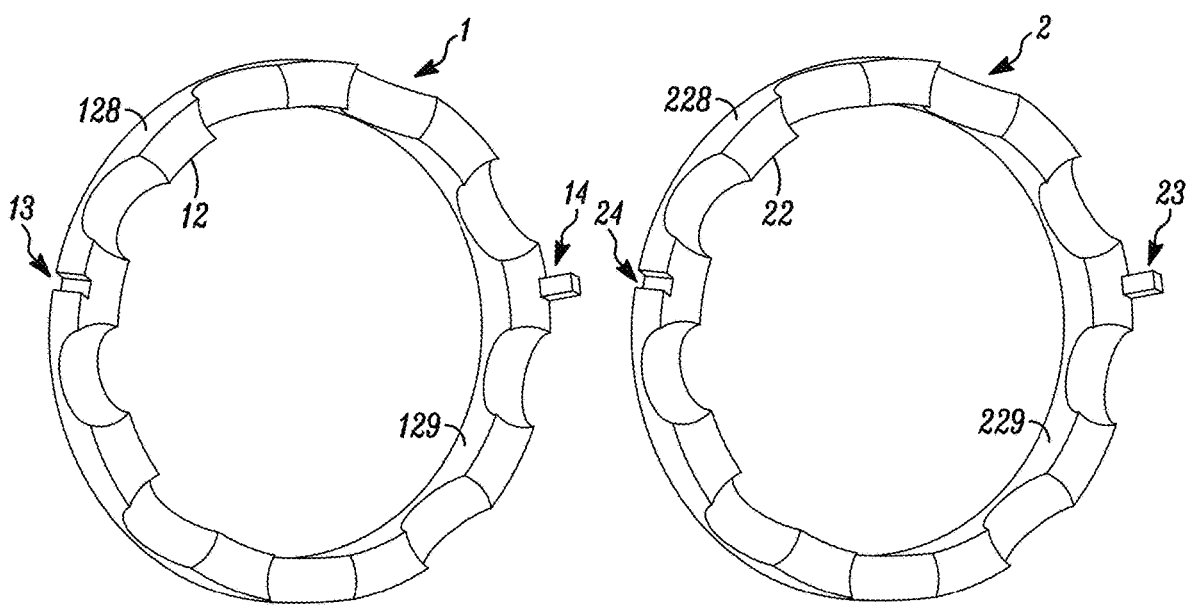
FIG. 7 is a schematic view of a cage according to yet another preferred embodiment of the present disclosure.

Specifically, as shown in FIG. 7, a first recess 13 may include an axial through groove at least formed on a radial outer side 128 of the first partition 12, and correspondingly, a second pin 23 may include an axial pin extending along the axial direction from a radial outer side 228 of the second partition 22.

Similarly, a second recess 24 may include an axial through groove at least formed on the radial outer side 228 of the second partition 22, and correspondingly, a first pin 14 may include an axial pin extending along the axial direction from the radial outer side 128 of the first partitions 12.

In other embodiments, a first recess may include an axial through groove (not specifically shown) formed on a radial inner side 129 of the first partition 12, and a second pin may include an axial pin (not specifically shown) extending along the axial direction from a radial inner side 229 of the second partition 22. Similarly, a second recess may include an axial through groove (not specifically shown) formed on the radial inner side 129 of the first partition 12, and a first pin may include an axial pin (not specifically shown) extending along the axial direction from the radial inner side 229 of the second partition 22.

In the above two configurations, the assembling and fixation of the cage can be realized by fixing the axial pins with the corresponding recesses together. For example, the interfacing seams between the axial pins and the corresponding recesses (including the interfacing seams on the radial sides and the interfacing seams on the axial sides (if any)) may be welded, or connected by adhesive or snap-fit structures.

Figure 8:
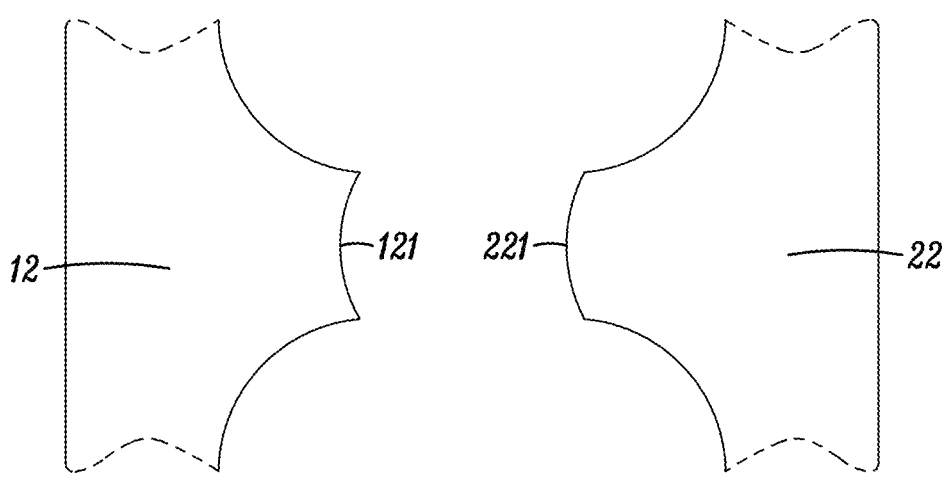
FIGS. 8-9 are schematic views of preferred embodiments of the axially inner sides of first and second sub-parts.
Figure 9:
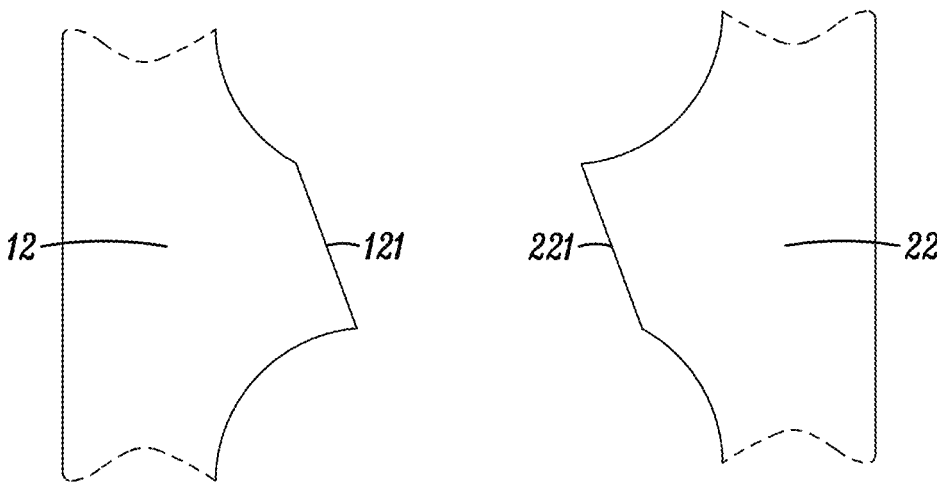

In addition, in the above-mentioned embodiments, the axial inner side of the first partition 12 is formed as a flat surface perpendicular to the axial direction, and the axial inner side of the second partition 22 is formed as a flat surface perpendicular to the axial direction, so that the abutting surfaces between the first partition 12 and the second partition 22 are flat surfaces. Furthermore, the present disclosure also provides a modification to the axial sides abutting each other between the first sub-part 1 and the second sub-part 2, as shown in FIGS. 8 and 9. For convenience, display of the recess and the pin is omitted from FIGS. 8 and 9.

Specifically, in the modification of FIG. 8, an axial inner side 121 of the first partition 12 is formed as a curved surface, and an axial inner side 221 of the second partition 22 is formed as a curved surface matching with the axial inner side 121. The two curved surfaces may preferably be surfaces in arc shape, or they may have any other curved shape, such as in a shape of wave. By arranging the abutting surfaces in the form of curved surfaces, it can further facilitate the first sub-part 1 and the second sub-part 2 to hold each other and prevent them from being dislocated and deformed along the circumferential direction. In addition, it should be understood that even if such curved surfaces are provided, it will not affect the formation of the recesses and the pins.

According to another modification, as shown in FIG. 9, an axial inner side 121 of the first partition 12 is formed as an inclined surface inclined relative to the axial direction, and an axial inner side 221 of the second partition 22 is formed as an inclined surface inclined relative to the axial direction and matching with the axial inner side 121. By arranging the abutting surfaces in the form of inclined surfaces, it can further facilitate the first sub-part 1 and the second sub-part 2 to hold each other and prevent them from being dislocated and deformed along the circumferential direction. In addition, it should be understood that even if such inclined surfaces are provided, they will not affect the formation of the recesses and the pins.

This non-planar axial sides design may also be used in combination with the embodiments of the present disclosure described above.

In addition, the present disclosure also provides some other improvements and deformations of the cage, and these improvements and deformations may also be used in combination with the above-mentioned embodiments.

According to one aspect of the present disclosure, an axial width ratio of the first partition 12 of the first sub-part 1 to the second partition 22 of the second sub-part 2 is 1:2 to 2:1.

According to this design, for example, when the axial width of the first partition 12 and the second partition 22 is 1:1, the first sub-part 1 and the second sub-part 2 can be completely the same, which is beneficial to reducing the cost for processing and manufacturing, and the assembling process is simple. However, due to this structure, the maximum circumferential diameter of the ball is located at the interfacing seam of the axial inner sides between the first sub-part and the second sub-part, which sometimes causes the balls to be dislocated (this dislocation often occurs in steel cages of the prior art that need riveting). When the axial width ratio of the first partition 12 and the second partition 22 is 1:2 or 2:1, the pocket of one of the sub-parts 1 or 2 will be relatively larger, so that the portion of the ball with the largest circumferential diameter can be enclosed by one sub-part, which prevents the ball from being dislocated.

According to another aspect of the present disclosure, the axial outer side of the first sub-part 1 may include a groove and/or the axial outer side of the second sub-part 2 may include a groove. Such grooves form material removal portions, which can further reduce the total weight of the cage.

Although the cage according to the present disclosure is described above by taking a deep groove ball bearing as an example, it should be understood that the concept of the present disclosure can also be applied to cages for other type rolling elements.

Moreover, the inventor of the present disclosure further studies and compares the performance of a prior art cage with one-piece polymer prongs and a fully-enclosed cage after welded according to the present disclosure (which includes the aforementioned groove) through simulation experiments. By inputting the correct simulation conditions, an actual working condition can be simulated very closely, which can accurately reflect the relevant performance of different cages under the actual working condition.

Specifically, the inventor compares the deformation of the prior art cage and that of the cage according to the present disclosure under different rotary speeds through simulation experiments, as shown in the following table.

The simulation experiments adopt a plug-in cage of the prior art and the cage of the present disclosure, with a diameter of about 28 mm, made of PA66-GF25, and calculated by using the elastic modulus of 2,000 MPa.

The loading condition is to apply centrifugal forces corresponding to different rotary speeds to the cages in a free status, and calculate the deformation of the cages under centrifugal force. The deformation of the prior art cage is compared with that of the cage of the present disclosure.

| Rotary Speed (RPM) | Prior Art Cage (mm) | Cage of the Present Disclosure (mm) |
|---|---|---|
| 1000 | 0.001~0.003 | 0.0001~0.0003 |
| 10000 | 0.15~0.20 | 0.005~0.01 |
| 20000 | 0.5~1 | 0.02~0.05 |
| 50000 | 2~4 | 0.1~0.3 |

It can be seen that the prior art cage has undergone great deformation under high rotary speeds above 10,000 RPM, and the cage faces the risk of flying off, so it cannot be competent for the bearing working condition with high rotary speeds. However, the deformation of the cage of the present disclosure is obviously smaller, and a normal operation of the bearing can be well ensured even under high rotary speed of 20,000 RPM.

Figure 10A:
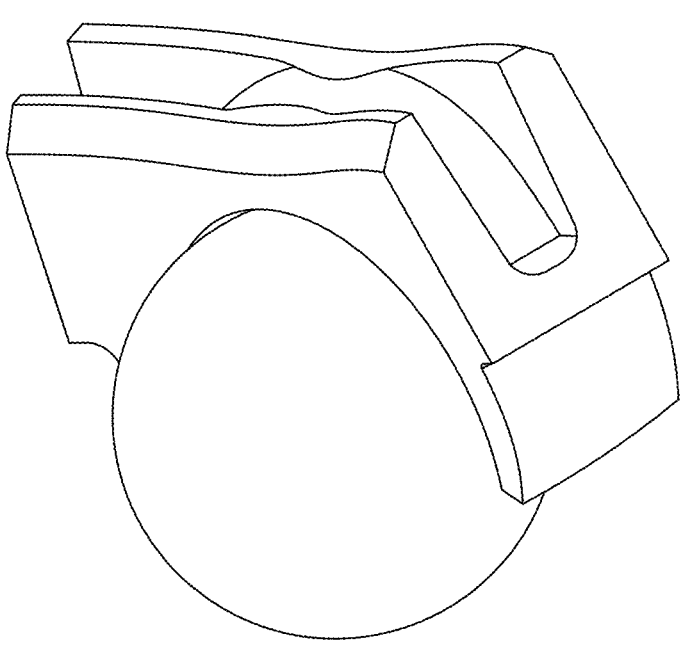
FIGS. 10A-B are a comparison between the simulation results of a prior art cage (FIG. 10A) and the cage (FIG. 10B) according to the present disclosure.
Figure 10B:
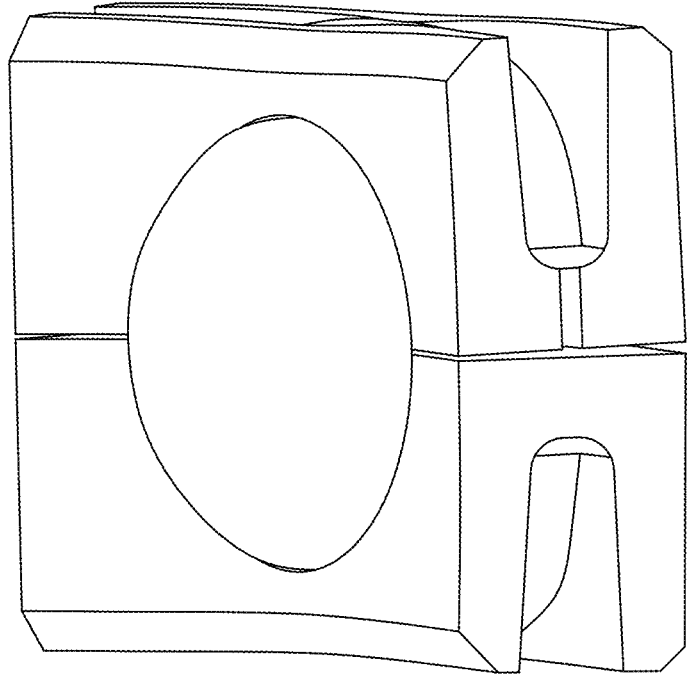

As further shown in FIGS. 10A-B, the inventor also studies the stress and strain of the prior art cage and that of the cage of the present disclosure through the above simulation experiments. Through comparison of the experiments, it can be seen that, under high rotary speeds, the prior art cage (FIG. 10A) has undergone great circumferential and radial deformation, that is, a serious umbrella effect has occurred. However, the cage (FIG. 10B) of the present disclosure hardly deforms, effectively holding the balls, can adapt to very severe high-temperature and high-speed working conditions, and has excellent stability.

Exemplary embodiments of the present disclosure have been described in detail above with reference to preferred embodiments, but those skilled can understand that various modifications and changes can be made to the above specific embodiments without departing from the concept of the present disclosure.

What is claimed is:

1. A cage comprising:

a first sub-part comprising a plurality of first partitions integrated as a whole and a plurality of first pocket portions formed by adjacent first partitions, the plurality of first partitions includes a first set of one or more first partitions, a second set of one or more first partitions, and a third set of one or more first partitions; and a second sub-part comprising a plurality of second partitions integrated as a whole and a plurality of second pocket portions formed by adjacent second partitions, wherein a pocket is formed by the first pocket portion and the second pocket portion corresponding to the first pocket portion, the plurality of second partitions includes a first set of one or more second partitions, a second set of one or more second partitions, and a third set of one or more second partitions;

wherein each first partition belonging to the first set of one or more first partitions includes a first recess and is free of a pin configured to mate with a recess of the second sub-part to connect the first and second sub-parts together, each first partition belonging to the second set of one or more first partitions includes a first pin and is free of a recess configured to mate with a pin of the second sub-part to connect the first and second sub-parts together, and each first partition belonging to the third set of one or more first partitions includes a second recess and a second pin;

wherein each second partition belonging to the first set of one or more second partitions includes a third pin and is free of a recess configured to mate with a pin of the first sub-part to connect the first and second sub-parts together, each second partition belonging to the second set of one or more second partitions includes a third recess and is free of a pin configured to mate with a recess of the first sub-part to connect the first and second sub-parts together, and each second partition belonging to the third set of one or more second partitions includes a fourth recess and a fourth pin;

wherein the first pin of each first partition belonging to the first set of one or more first partitions is fixed in the third recess of the corresponding second partition belonging to the second set of one or more second partitions, the third pin of each second partition belonging to the first set of one or more second partitions is fixed in the first recess of the corresponding first partition belonging to the first set of one or more first partitions, the second pin of each first partition belonging to the third set of one or more first partitions is fixed in the fourth recess of the corresponding second partition belonging to the third set of one or more second partitions, and the fourth pin of each second partition belonging to the third set of one or more second partitions is fixed in the second recess of the corresponding first partition belonging to the third set of one or more first partitions.

2. The cage according to claim 1, wherein:

the first recess is a through hole penetrating through two axial sides of the first partition, and the third pin is exposed from the through hole of the first recess, an end of the third pin is welded to a surrounding portion thereof; and/or the third recess is a through hole penetrating through two axial sides of the second partition, and the first pin is exposed from the through hole of the third recess, an end of the first pin is welded to a surrounding portion thereof.

3. The cage according to claim 2, wherein:

the second recess is a through hole penetrating through two axial sides of the first partition, and the fourth pin is exposed from the through hole of the second recess, an end of the fourth pin is welded to a surrounding portion thereof; and/or the fourth recess is a through hole penetrating through two axial sides of the second partition, and the second pin is exposed from the through hole of the fourth recess, an end of the second pin is welded to a surrounding portion thereof.

4. The cage according to claim 1, wherein:

an axial inner side of at least one first partition is formed as a flat surface perpendicular to the axial direction, and an axial inner side of at least one second partition is formed as a flat surface perpendicular to the axial direction; or an axial inner side of at least one first partition is formed as a curved surface, and an axial inner side of at least one second partition is formed as a curved surface matching with the axial inner side of said at least one first partition; or an axial inner side of at least one first partition is formed as an inclined surface inclined relative to the axial direction, and an axial inner side of at least one second partition is formed as an inclined surface inclined relative to the axial direction and matching with the axial inner side of said at least one first partition.

5. The cage according to claim 1, wherein an axial width ratio of at least one first partition to at least one second partition is 1:2 to 2:1.

6. The cage according to claim 1, wherein the first sub-part and the second sub-part are identical.

7. The cage according to claim 1, wherein the first pin, the second pin, the third pin, and the fourth pin are each fixed in the respective first recess, the second recess, the third recess, and the fourth recess by welding or adhesion bonding.

8. The cage according to claim 1, wherein:

the first recess includes an axial through groove at least formed on a radial outer side of the first partition, and the third pin includes an axial pin extending along the axial direction from a radial outer side of the second partition; and/or the third recess includes an axial through groove at least formed on a radial outer side of the second partition, and the first pin includes an axial pin extending along the axial direction from the radial outer side of the first partition.

9. The cage according to claim 8, wherein:

the second recess includes an axial through groove at least formed on the radial outer side of the first partition, and the fourth pin includes an axial pin extending along the axial direction from the radial outer side of the second partition; and/or the fourth recess includes an axial through groove at least formed on the radial outer side of the second partition, and the second pin includes an axial pin extending along the axial direction from the radial outer side of the first partition.

10. The cage according to claim 9, wherein an axial width ratio of the plurality of first partitions to the plurality of second partitions is 1:2 to 2:1.

11. The cage according to claim 9, wherein the first sub-part and the second sub-part are identical.

12. The cage according to claim 9, wherein:

an axial inner side of each first partition is formed as a flat surface perpendicular to the axial direction, and an axial inner side of each second partition is formed as a flat surface perpendicular to the axial direction; or an axial inner side of each first partition is formed as a curved surface, and an axial inner side of each second partition is formed as a curved surface matching with the axial inner side of each first partition; or an axial inner side of each first partition is formed as an inclined surface inclined relative to the axial direction, and an axial inner side of each second partition is formed as an inclined surface inclined relative to the axial direction and matching with the axial inner side of each first partition.

13. A ball bearing comprising the cage according to claim 12.

14. A ball bearing comprising the cage according to claim 1.

* * * * *